United States Patent [19]

Biegert et al.

[11] 3,728,683

[45] Apr. 17, 1973

[54] APPARATUS FOR CONTROLLING OUTPUT DATA RATE

[75] Inventors: Karl E. Biegert, Moorestown; Robert M. Tice, Glassboro, both of N.J.

[73] Assignee: Ultronic Systems Corp., Moorestown, N.J.

[22] Filed: July 30, 1971

[21] Appl. No.: 167,662

[52] U.S. Cl. .................................................340/172.5

[51] Int. Cl. .................................................G06f 5/06

[58] Field of Search ....................................340/172.5

[56] References Cited

UNITED STATES PATENTS

| | | | |
|---|---|---|---|
| 3,374,467 | 3/1968 | Cast et al. | 340/172.5 |
| 3,465,302 | 9/1969 | Andrews et al. | 340/172.5 |
| 3,454,930 | 7/1969 | Schoeneman | 340/172.5 |
| 2,905,930 | 9/1959 | Golden | 340/172.5 |

*Primary Examiner*—Gareth D. Shaw
*Attorney*—Elmer J. Nealon et al.

[57] ABSTRACT

Apparatus for controlling the output data rate in a time division multiplexing system (TDM) for generating data including a stop bit employs a means for automatically sensing a buildup of input data in an input buffer and a means for automatically adjusting the time interval of the stop bit inversely with the data buildup in the buffer.

14 Claims, 1 Drawing Figure

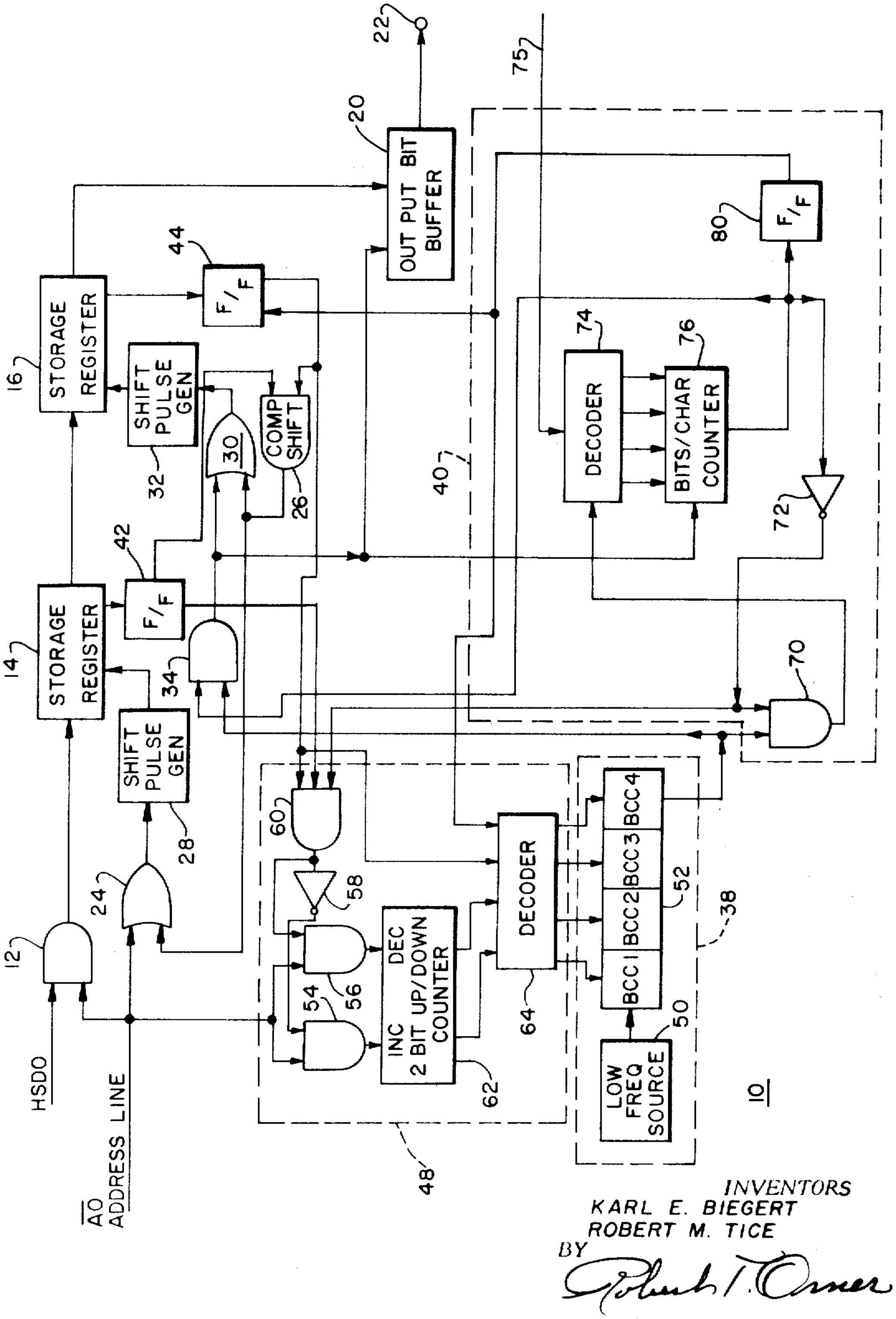
INVENTORS
KARL E. BIEGERT
ROBERT M. TICE
BY
Robert T. Orner
ATTORNEY

APPARATUS FOR CONTROLLING OUTPUT DATA RATE

BACKGROUND OF THE INVENTION

The invention relates to a time division multiplexing (TDM) system and in particular to a device for automatically controlling the output data rate in a TDM system generating coded data (using a stop bit) from an asynchronous source.

In a character interleaved TDM system, data is assembled from several Teletype lines and is placed on a high speed channel. The high speed channel is partitioned into frames which are set to scan at a rate slightly faster than the nominal Teletype signal. This faster frame rate is required because the timing inaccuracies of machines feeding the high speed channel can cause a higher than nominal input character rate, and a corresponding increase in the output rate must be provided to preclude the loss of data.

One prior art method of adjusting the output character rate includes shortening the stop bit interval a fixed amount by manually programming a specific decode of a counter. To insure no loss of data, the stop bit interval was shortened to accommodate the fastest data channel expected. This shortening of the stop bit to accommodate the faster data channel resulted in momentary pauses in the printing of the data at the lower character rates.

It would therefore be advantageous to have and it is one of the objects of this invention to provide a device for incrementally changing the interval of the stop bit as a function of the input character rate on a per channel basis.

SUMMARY OF THE INVENTION

Apparatus for automatically controlling the output data rate of an electronic device generating data from a digital source includes a first storage means coupled to the digital source and being operative to store data received from the digital source at a first predetermined rate. An output storage means, including an output buffer stage, is coupled between the first storage means and an output terminal and is operative to store data received from said first storage means and to transmit the data to the output terminal at a second predetermined rate. Coupled to the first storage means and to the output storage means is a means for adjusting the length of a data bit in the output buffer stage in response to data being present in both the first storage means and the output storage means.

Data having a predetermined rate is received in the first storage means. The received data is transferred via the output storage means and the output buffer stage to the output terminal which may be connected to a telegraph line. When the last bit (the stop bit) of a data word is in the output stage, a second data word, if present in the first storage means, is transferred to the output storage means and a third data word, if available, is received from the digital source and stored in the first storage means. When the second and third data words are present in their respective storage means, the last bit of the first data word in the output buffer stage is shortened by a fixed amount thus increasing the transfer rate to the output terminal.

DESCRIPTION OF THE DRAWING

The construction and operation of the apparatus for controlling the output data rate will be more fully understood from the following detailed description taken in conjunction with the accompanying FIGURE which shows a preferred embodiment of the apparatus according to the invention.

DETAILED DESCRIPTION

An embodiment 10 of the apparatus according to the present invention is shown in the accompanying FIGURE and includes a first gate 12 having one input connection coupled to a source of high speed data (not shown), a second input connection coupled to a control source (not shown) and an output connection coupled to a first storage device such as a first storage register 14 having, for example, nine stages or positions. A second storage device, for example, the storage register 16, has an input connection coupled to the output connection of the first storage register 14 and an output connection coupled to a first input connection of an output buffer 20, the output connection of which is coupled to an output terminal 22 of the apparatus 10.

A second gate 24, for example, an OR gate, has a first input connection from the control source, a second input connection from a compressed shift gate 26 and an output connection connected to a first shift pulse generator 28, the output connection of which is connected to the first storage register 14. Similarly, a third gate 30 has its output connection connected to a second shift pulse generator 32 associated with the second storage register 16. The third gate 30 has input connections from the compressed shift gate 26 and a fourth gate 34, the inputs of which originate at the outputs of a low frequency clock means 38 and a bit counter means 40, both of which will be discussed in detail hereinafter.

Each storage register 14 and 16 has associated therewith a means such as the respective flip-flops 42 and 44 for indicating that the register is full (or a character is stored therein). First output connections of the flip-flops 42 and 44 are connected to the input of the compressed shift gate 26 and second output connections are connected to a bit adjusting means 48 (to be discussed in detail hereinafter), the output of which is coupled to the input of the low frequency clock means 38. The low frequency clock means 38 generates a low frequency signal, for example, a 110 hertz signal, from a low frequency source 50 such as a 1,760 hertz signal, coupled to a four stage, divide by 16 counter 52.

The bit adjustment means 48 includes fifth and sixth gates 54 and 56, respectively, each having a first input connection from the common juncture of the input connections to the first and second gates 12 and 24, respectively. Connected to the second input connection of the fifth gate 54 is an output connection of an inverter 58, the input connection of which is connected to the output connection of a seventh gate 60. The output connection of the seventh gate 60 is also connected to the second input connection of the sixth gate 56. Input connections to the seventh gate include output connections from the flip-flops 42 and 44 and from the bit counter means 40.

The output connections of the fifth and sixth gates 54 and 56 are connected to the increment terminal and decrement terminal, respectively, of an up/down counter, for example, a two bit up/down counter 62, the output connections of which are connected to a first decoder 64. Output connections from the decoder 64 are coupled to the divide by 16 counter 52 of the low frequency clock means 38.

The bit counter means 40 includes an eighth gate 70 having a first input connection coupled to the output connection of the low frequency clock means 38, a second input connection coupled to an inverter 72 and an output connection coupled to a second decoder 74. A bits per character counter 76 has input connections connected to the output of the fourth gate 34 and the output connections of the decoder 74 and an output connection connected to the first input connection of the fourth gate 34, the input connection of the inverter 72 and the input connection of a stop bit flip-flop 80. The output connection of the stop bit flip-flop 80 is coupled to the first decoder 64 and the flip-flop 44.

To better understand the operation of the apparatus 10, a function description is presented. When data on the high speed data line (HSDO) is intended for the particular channel shown in the FIGURE, the address line (AO) becomes active causing the high speed data to be gated to the input of the first storage register 14. Also, as a direct result of the address line being active, the shift pulse generator 28 is enabled via the second gate 24 producing shift pulses to the first storage register 14. The data thus ripples through the first storage register with the first data bit resting in position 8 (for an input character having eight bits). Position 9 of the first storage register 14 is reset to indicate the start bit.

With a character stored in the first storage register 14, the flip-flop 42 is set. With no data character in the second storage register 16, indicated by the flip-flop 44 being in a reset condition, and with the flip-flop 42 in the set condition, the compressed shift gate 26 is activated thereby enabling the shift pulse generators 28 and 32 via respective gates 24 and 30. The character stored in the first storage register 14 is transferred to the second storage register 16. When the character start bit reaches position 9 of the second storage register 16, the flip-flop 44 changes state disabling compressed shift gate 26 to thereby stop the shifting operation.

The next step in the processing of a character to the output terminal 22 is to transfer the start bit from position 9 of the second storage register 16 to the output buffer 20. To accomplish this, a shift is generated by the shift pulse generator 32 and a trigger pulse is applied to the output buffer 20 in the following manner. The first decoder 64 provides an inhibit signal on the four stages of the counter 52 when a character is not present in the second storage register 16. When the first bit of a character reaches position 9 of the second storage register 16, the inhibit signal provided by the first decoder 64 is removed and the four stages BCC1, BCC2, BCC3, BCC4 of the counter 52 are preset to 1 in a well-known manner. The next pulse from the low frequency source 50 causes the counter 52 to increment to all 0's and generates a low speed shift pulse. The low speed shift pulse enables the shift pulse generator 32 for one shift pulse interval via third and fourth gates 30 and 34, triggers the output buffer 20 via the fourth gate 34, and increments the bits per character counter 76 via the fourth gate 34.

The bits per character counter 76 is preset via the second decoder 74 by a control line 75 (from a source not shown) to a specific number depending upon the number of bits contained in a character to be transmitted. Assuming there are 10 bits per character (one start bit, eight data bits and one stop bit), a binary two (0010) is preset into the counter. The start bit will remain in the output buffer 20 until the next low speed shift pulse is produced by the low frequency clock means 38 which will not occur until the second counter 52 is once again incremented to 0000 (after sixteen pulses from the low frequency source 50). Upon the generation of a second low speed shift pulse, the data in the second storage register 16 is shifted one more position to the right and the output buffer 20 is loaded with the next bit to be transmitted.

Shifting of the data into the output buffer 20 continues in the aforementioned manner until the bits per character counter 76 is incremented to the binary number 1100 (the decimal number 12). At this time, the stop bit is being strobed into the output buffer 20 and the output of the bits per character counter 76 produces a stop bit in progress signal. The stop bit in progress signal triggers the flip-flop 44 indicating the second storage register 16 is empty. The stop bit in progress signal also enables the decoded output signal of the first decoder 64 to preset the proper stages BCC1 through BCC4 of the divide by 16 counter 52 for the stop bit timing.

Assume no shaving of the bit length is to occur on the stop bit stored in the output buffer 20, the divide by 16 counter 52 is preset to 0001. After 15 signals from the low frequency source 50, the divide by 16 counter will increment to 0000. At this point, the stop bit has been present in the output buffer stage 20 for 15/16 of a bit time. Ordinarily at this time, the output signal from the low frequency clock means 38 causes, via the third and fourth gates 30 and 34, the shift pulse generator 32 to generate a shift pulse to shift the data in the second storage register 16 and strobes the bit from position 9 of the second storage register 16 into the output buffer 20.

If this were allowed to occur, the stop bit would only be 15/16 of a bit time in length. However, the fourth gate 34 is not enabled because the stop bit in progress signal disables the fourth gate 34. The output signal from the low frequency clock means 38, however, enables the eighth gate 70 which produces a character complete signal which, in turn, resets the bits per character counter 76 to the number 0010. With the bits per character counter preset to this configuration, the stop bit in progress signal is inactivated thus again enabling the fourth gate 34 allowing a shift pulse to be generated at the next output signal from the low frequency clock means 38. With the subsequent shifting of the data in the second storage register 16 and the loading of the output buffer with the stop bit of the next character, the length of the stop bit of the previous character in the output buffer was substantially 16/16 of a bit time.

The operation recited thus far assumes the apparatus 10 is processing the high speed data without building up a backlog of data. Assume now that a new character to be transmitted is present in the second storage register 16 prior to the complete transmission of the preceding character (the stop bit is in the output buffer 20) and a new character has just been shifted into the first storage register 14 from the high speed data line. This means that the first and second storage registers 14 and 16 are full and a stop bit of a third character is being processed at the output buffer 20. When this situation occurs, transmission rate of the characters must be increased, for example, by decreasing the time interval of the stop bit being processed in the output buffer 20. The stop bit time interval may be decreased in a predetermined increment, 1/16, and the number of increments depends on the degree of time conflict of the three characters being processed by the apparatus 10.

With a character present in both the first and second storage registers 14 and 16, the flip-flops 42 and 44 are set enabling the seventh gate 60 which produces a counter increment signal to prime the fifth gate 54 via the inverter 58. (The cessation of the address signal on the address line AO may be employed in lieu of the output signal from the flip-flop 42.) when the address line AO becomes inactive, the primed gate, fifth gate 54, causes the up/down counter to be incremented from its quiescent (no conflict) state, 01, to its initial conflict state of 10. When the stop bit in progress signal from the bits per character counter 76 once again becomes active, the output signal of the up/down counter 62 will be decoded by the first decoder 64 and used to preset the divide by 16 counter 52. The divide by 16 counter is preset to 0010 causing it to increment to 0000 after only 14 low frequency source signals rather than 15 previously described for a full stop bit. Thus, the stop bit in the output buffer 20 will be 15/16 of a bit time interval.

If a conflict still exists with 1/16 being shaved from the stop bit, the seventh and fifth gates 60 and 54 will again be enabled producing a counter incrementing signal in conjunction with the cessation of the address line signal AO. The up/down counter 62 is incremented to 11 causing the first decoder 64 to preset the divide by 16 counter 52 to 0011 producing a stop bit of 14/16 duration.

When a conflict no longer exists (the output buffer 20 is empty when a new character is shifted into the second storage register 16), the fifth gate 54 is not enabled. However, the sixth gate 56 is enabled as both the fifth and sixth gates are activated by the output signal from the seventh gate 60 and a counter decrement signal at the up/down counter 62. The up/down counter is thus decremented by 1 for each character transferred in from the high speed line until a conflict again exists or until the up/down counter 62 is decremented to its quiescent state (01).

As stated hereinabove, the quiescent state of the two bit up/down counter 62 is when the binary number 01 is stored therein. When the up/down counter 62 is in this state, no shaving of the stop bit occurs. The amount of stop bit shaving for each configuration and the corresponding contents of the up/down counter 62 are as follows:

| Up/Down Counter Contents | Shaving Fraction |
|---|---|
| 01 | 0 |
| 10 | 1/16 |
| 11 | 2/16 |
| 00 | 3/16 |

The bits per character counter 76 is a four bit incrementing counter employed to keep track of the bits per character transmitted to the output terminal 22. Its primary function is to inform the apparatus 10 when the stop bit is being transmitted to the output terminal 22. The bits per character counter 76 is preset via line 75 and the second decoder 74 to a number which corresponds to the number of bits to be transmitted to the output terminal 22. Preset values for the corresponding number of bits to be transmitted are listed below:

| Preset Configuration | Bits/Character to be Transmitted |
|---|---|
| 0001 | 11 |
| 0010 | 10 |
| 0011 | 9 |
| 0100 | 8 |

While there has been shown and described what is considered a preferred embodiment of the present invention, it will be obvious to those skilled in the art that various changes and modifications may be made therein without departing from the invention.

What is claimed is:

1. Apparatus for automatically controlling the output data rate of an electronic device generating data from a digital source, said data including data words each having a control bit, said apparatus comprising:
   an output terminal;
   first storage means adapted to be coupled to said digital source and being operative to store data words received from said digital source, said first storage means operating at a first predetermined rate;
   output storage means including an output buffer stage and being coupled between said first storage means and said output terminal, said output storage means being operative to store data words received from said first storage means and to transmit said data words via said output buffer stage to said output terminal at a second predetermined rate; and
   means operative to determine the presence in the first storage means and output storage means of data words and to determine the presence in the output buffer stage of a control bit of a data word, said means being operative in response to determining the presence of a first data word in the first storage means, a second data word in the output storage means, and the control bit of a third data word in the output buffer stage to adjust the length of the control bit in the output buffer stage while leaving the first and second data words in the first storage means and output storage means, respectively, unchanged.

2. Apparatus for automatically controlling the output data rate of an electronic device generating data from a digital source, said data including data words each having a control bit, said apparatus comprising:
   an output terminal;
   first storage means adapted to be coupled to said digital source and being operative to store data words received from said digital source at a first predetermined rate;

output storage means including an output buffer stage and being coupled between said output terminal and said first storage means and being operative to store data words received from said first storage means and to transfer said data words to said output terminal via said output buffer stage at a second predetermined rate;

shifting means having an output connection coupled to said output buffer stage and an input connection and being operative in response to a coded signal at its input connection to generate at its output connection shift pulses at a predetermined rate dependent upon said coded signal;

sensing means coupled to the input connection of the shifting means and operative to determine the presence in the first storage means and output storage means of data words and to determine the presence in the output buffer stage of a control bit of a data word, said sensing means being operative in response to determining the presence of a first data word in the first storage means, a second data word in the output storage means, and the control bit of a third data word in the output buffer stage to produce a coded signal at the input connection of the shifting means to change the predetermined rate of said shifting means thereby changing the rate of the data being transmitted from said output buffer stage.

3. Apparatus according to claim 2 further including a compressed shift enabling means having a first input connection coupled to said first storage means, a second input connection coupled to said output storage means and an output connection coupled to said first storage means and said output storage means and being operative in response to data being stored in said first storage means and no data stored in said output storage means to cause the data stored in said first storage means to be transferred to said output storage means.

4. Apparatus according to claim 3 wherein said first storage means includes:

first gating means having a first input connection adapted to be coupled to the digital source, a second input connection and an output connection and being operative in response to a first enabling signal at its second input connection to pass the data from said digital source at its first input connection to its output connection;

second gating means having a first input connection coupled to the second input connection of said first gating means, a second input connection coupled to the output connection of said enabling means and an output connection and being operative in response to a signal at either its first or second input connection to generate a signal at its output connection;

first shift pulse generating means having an input connection connected to the output connection of said second gating means and an output connection and being operative to generate a series of shift pulses at its output connection in response to a signal at its input connection;

a first storage register having a plurality of stages and having a first input connection coupled to the output connection of said first gating means, a second input connection coupled to the output connection of said first shift pulse generating means, a first output connection coupled to the input connection of said output storage means, a second output connection from one of said plurality of stages and being operative in response to a shift pulse at its second input connection to sequentially transfer data from its first input connection to its first output connection; and first indicator means having an input connection connected to the second output connection of said first storage register and output connections coupled to said sensing means and said enabling means and being operative in response to a predetermined number of bits stored in said first storage register to generate an output signal at its output connection.

5. Apparatus according to claim 3 wherein said output storage means includes:

third gating means having a first input connection coupled to said shifting means, a second input connection coupled to said enabling means and an output connection and being operative in response to a signal at either its first or second input connection to generate an output signal at its output connection;

second shift pulse generating means having an input connection coupled to the output connection of said third gating means and an output connection, and being operative in response to an output signal from said third gating means to generate a shift pulse at its output connection;

a second storage register having a plurality of stages, a first input connection coupled to the output connection of said first storage means, a second input connection connected to the output connection of said second shift pulse generating means, a first output connection coupled to said output buffer stage and a second output connection from one of said plurality of stages of said second storage register, said second storage register being operative in response to shift pulses at its second input connection to transfer data from said first storage means through said plurality of stages to said output buffer stage; and second indicator means having an input connection coupled to the second output connection of said second storage register and output connections coupled to said enabling means and to said sensing means, said second indicator means being operative in response to a predetermined signal at its input connection to generate a predetermined signal at its output connection indicating that said second storage register has a predetermined number of bits stored therein.

6. Apparatus according to claim 2 wherein said shifting means includes:

a low frequency clock source operative to generate a low frequency clock signal; and a counter having a predetermined number of stages, each of said stages having an input connection coupled to said sensing means and adapted to receive a preset signal, said counter being operative to divide the low frequency clock signal by a predetermined number determined by said preset signal to thereby determine the rate of the data being transferred from said output buffer to said output terminal.

7. Apparatus according to claim 2 wherein said sensing means includes:

means for counting bits per character having an input connection coupled to said shifting means and an output connection and being operative to generate a signal at its output connection when a predetermined bit of a character to be transmitted is in said output buffer stage; and code generating means having input connections coupled to said means for counting, said first storage means and said output storage means and an output connection coupled to said shifting means and being operative in response to the presence or absence of data in said first storage means and in said output storage means when the signal is generated at the output connection of said means for counting to generate said coded signal at its output connection.

8. Apparatus according to claim 7 wherein said means for counting bits per character includes:

decoder means having a predetermined number stored therein; and counter circuit having a first input connection coupled to said shifting means and an output connection coupled to said code generating means and being operative in response to a shifting signal at its first input connection to advance the count in steps from said predetermined number of said decoder means and to generate an output signal at the output connection of said counter circuit when the count reaches a second predetermined number.

9. Apparatus according to claim 7 wherein said code generating means includes:

fourth gating means having input connections from said first storage means, said output storage means and said means for counting bits per character and an output connection and being operative in response to signals at its input connections indicating the presence of data in said first storage means and said output storage means coincident with the signal from said means for counting bits per character to generate a first signal condition and being operative in response to the absence of data in said output storage means and the presence of data in said first storage means and coincident with the signal from said means for counting bits per character to generate a second signal condition; and up/down counter means having an input connection coupled to said fourth gating means and an output connection coupled to the input connection of said shifting means and being operative to generate a first coded signal at its output connection indicating the second signal condition of said fourth gating means and to change the coded signal in a predetermined manner in response to the first signal condition generated by said fourth gating means.

10. Apparatus according to claim 4 wherein said output storage means includes:

third gating means having a first input connection coupled to said shifting means, a second input connection coupled to said enabling means and an output connection and being operative in response to a signal at either its first or second input connection to generate an output signal at its output connection;

second shift pulse generating means having an input connection coupled to the output connection of said third gating means and an output connection, and being operative in response to an output signal from said third gating means to generate a shift pulse at its output connection;

a second storage register having a plurality of stages, a first input connection coupled to the output connection of said first storage means, a second input connection connected to the output connection of said second shift pulse generating means, a first output connection coupled to said output buffer stage and a second output connection from one of said plurality of stages of said second storage register, said second storage register being operative in response to shift pulses at its second input connection to transfer data from said first storage means through said plurality of stages to said output buffer stage; and second indicator means having an input connection coupled to the second output connection of said second storage register and output connections coupled to said enabling means and to said sensing means, said second indicator means being operative in response to a predetermined signal at its input connection to generate a predetermined signal at its output connection indicating that said second storage register has a predetermined number of bits stored therein.

11. Apparatus according to claim 10 wherein said shifting means includes:

a low frequency clock source operative to generate a low frequency clock signal; and a counter having a predetermined number of stages, each of said stages having an input connection coupled to said sensing means and adapted to receive a preset signal, said counter being operative to divide the low frequency clock signal by a predetermined number determined by said preset signal to thereby determine the rate of the data being transferred from said output buffer to said output terminal.

12. Apparatus according to claim 11 wherein said sensing means includes:

means for counting bits per character having an input connection coupled to said shifting means and an output connection and being operative to generate a signal at its output connection when a predetermined bit of a character to be transmitted is in said output buffer stage; and code generating means having input connections coupled to said means for counting, said first storage means and said output storage means and an output connection coupled to said shifting means and being operative in response to the presence or absence of data in said first storage means and in said output storage means when the signal is generated at the output connection of said means for counting to generate said coded signal at its output connection.

13. Apparatus according to claim 12 wherein said means for counting bits per character includes:

decoder means having a predetermined number stored therein; and counter circuit having a first input connection coupled to said shifting means and an output connection coupled to said code generating means and being operative in response to a shifting signal at its first input connection to advance the count in steps from said predetermined number of said decoder means and to generate an output signal at the output connection of said counter circuit when the count reaches a second predetermined number.

14. Apparatus according to claim 13 wherein said code generating means includes:

fourth gating means having input connections from said first storage means, said output storage means and said means for counting bits per character and an output connection and being operative in response to signals at its input connection indicating the presence of data in said first storage means and said output storage means coincident with the signal from said means for counting bits per character to generate a first signal condition and being operative in response to the absence of data in said output storage means and the presence of data in said first storage means and coincident with the signal from said means for counting bits per character to generate a second signal condition; and up/down counter means having an input connection coupled to said fourth gating means and an output connection coupled to the input connection of said shifting means and being operative to generate a first coded signal at its output connection indicating the second signal condition of said fourth gating means and to change the coded signal in a predetermined manner in response to the first signal condition generated by said fourth gating means.

* * * * *